INVENTORS
WILLIAM A. SCHEUBLEIN JR.
LOUIS P. FISTER

Gravely, Lieder & Woodruff
ATTORNEYS

United States Patent Office 3,401,962
Patented Sept. 17, 1968

3,401,962
WEAR-COMPENSATING MOVABLE
JOINT DEVICE
William A. Scheublein, Jr., Ballwin, and Louis P. Fister,
St. Louis, Mo., assignors to Moog Industries, Inc., St.
Louis, Mo., a corporation of Missouri
Filed Dec. 6, 1965, Ser. No. 511,609
16 Claims. (Cl. 287—87)

ABSTRACT OF THE DISCLOSURE

A movable joint device having a stud head bearinged in a housing such that the outside force imposed on the joint during the normal operation thereof causes the stud head to rotate and swivel relative to the housing, and wear-compensating means operably mounted within the joint to make use of the energy in the outside force imposed thereon to energize the operation of the wear compensating means for the purpose of maintaining the movable joint device from displaying looseness because of internal wear.

---

This invention relates to improvements in movable joint devices such as ball joint devices for vehicles, and especially to movable joint devices adapted to compensate for wear.

A problem of major importance in movable joint devices is control over the looseness that inevitably develops after a period of time, and especially when the devices are subject to excessive loads, inadequate or substantially no lubrication, and extremes of dirt conditions. Attempts have been made to force the wearing parts in a joint device to take up wear by spring loading means exerting either linear or torsional forces. Some other means of manually adjustable character have been proposed, but the need for an effective and simple device that will easily and positively compensate for wear and thereby hold its accuracy has continued up to now.

It is a primary object of the present invention to provide a wear-compensating movable joint device with simple means to continuously compensate for wear upon relative movement between at least two principal members or elements of the device.

It is also a primary object of the present invention to provide a movable joint device with an assembly of parts in which normal operation will develop relative movement between various parts of the assembly and to utilize such movement to compensate for wear.

It is also an object of the present invention to provide a movable joint device with a housing and a projecting shank on the usual ball head or stud, and to dispose between these two parts elements that will adjust for wear merely by the relative movement between the housing and stud.

It is another object of this invention to provide a wear-compensating unit that can be inserted in a movable joint assembly to become operative as to parts of the assembly move relatively to each other.

A further object of the invention is to provide a wear-compensating movable joint device with means to compensate for axial looseness due to wear and to have such discrimination between angular and rotational motion and make use of the selected movement between certain members or elements of the device to effect compensation.

Still a further object of the invention is to provide a movable joint device with at least two members that have relative turning motion and to operatively connect such members with wear-compensating means.

Still another object of the invention is to provide a movable joint device with at least two members that have relative movement and to operatively connect such members with friction responsive elements that compensate for wear.

Another object of the invention is to provide a movable joint device of the foregoing character in which wear compensation is achieved through the relative movement of magnetic elements, and to utilize such relative movement which may be rotary to effect axial displacement which compensates for the wear.

Other objects and advantages of the invention will be set forth in the following specification which relates to certain preferred forms of the invention disclosed in the accompanying drawings, wherein.

In the form of movable joint device selected for illustration, it is understood that such device usually includes a housing or socket member and a stud member having an enlarged bearing head operatively mounted in the housing. The housing is connected to one portion of the vehicle and the shank of the stud is connected to another portion of the vehicle such that there is relative movement between these members. The relative movement may be either or both rotational and angular in character. With the foregoing understanding in mind, the subsequent disclosure will proceed in setting down certain requirements for the present wear compensation movable joint devices.

Wear compensation or adjustment occurs when a condition of relative rotary or oscillatory motion takes place between the housing and the stud in one direction. Such rotational displacement is utilized to adjust out vertical looseness, and when the looseness is corrected, the members slip relative to each other. Such members are prevented from undoing the correction when the relative rotational displacement is reversed. To achieve this mode of operation, the following must be accomplished:

(a) At least two members of the movable joint device must be engaged such that when relative rotational or oscillational motion occurs in one direction only the vertical or axial clearance or looseness will be taken up. These members are made to correct for looseness through means providing inclined planes, such as threads, cams and the like, which convert rotational movement or oscillation into linear displacement.

(b) The device must have means which introduces differential friction forces which are effective in rotation, and in which one means developing a friction force responsive to the rotational movement is initially greater than a friction force developed by the inclined plane means. The first mentioned friction force developing means which is responsive to the rotational movement, must reach a maximum limit at substantially the point where vertical clearance is corrected, and at such point the friction force of the inclined plane means must become greater so that slippage occurs in the first friction developing means.

(c) The device must incorporate means which provides a positive stop in the direction of rotary movement opposite to that which effects the vertical correction so that reverse displacement will not undo the compensation and also allow the device to intermittently correct for wear when necessary.

Figure 1:
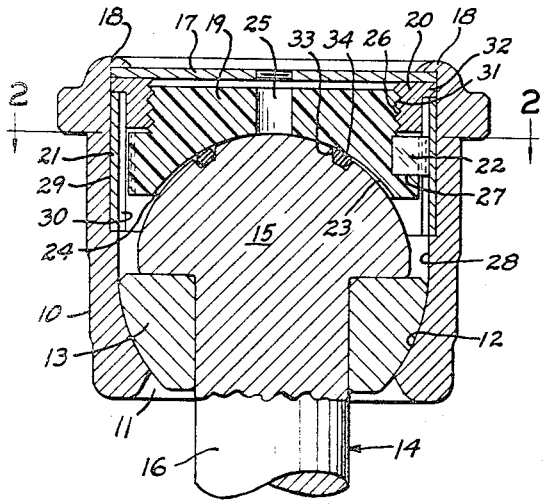
FIGURE 1 is a vertical sectional view of a movable joint device embodying the features of this invention.
Figure 2:
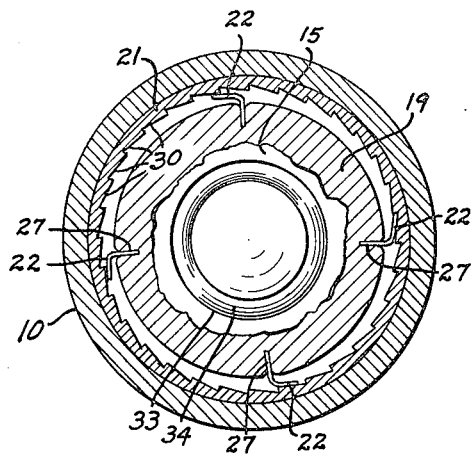
FIGURE 2 is a sectional plan view taken at line 2—2 in FIGURE 1.

Turning now to FIGURES 1 and 2, the tension loaded movable joint device illustrated includes a housing 10 having an opening 11 at one end which is internally formed to provide a seat 12 for a bearing 13. A stud 14 has its enlarged fragmentary spherically shaped head 15 mounted on the bearing 13 and the shank 16 projecting through the bearing and the opening 11 for connection to an external member, not shown. The head 15 and bearing 13 together constitute a ball-like head which has angular and rotational movement relative to housing 10. The opposite end of the housing 10 is closed by a cover plate 17 secured by spinning over a flange 18. Rotation as used here means the ability to turn about an axis in both directions and not just in one direction.

Between the stud head 15 and the cover 17 there is operably disposed a wear compensating unit which includes a bearing element 19, a fixed ring element 20, a fixed ratchet ring 21 and ratchet fingers 22. It is possible to broach the teeth of the ratchet ring 21 as an integral part of the housing 10 to thereby eliminate the separate ring piece. The bearing element 19 is formed with a fragmentary spherical bearing surface 23 having a radius which is larger than the radius of the stud head 15 so that there is a clearance space 24 outwardly of the zone of contact adjacent the lubricant passage 25. The element also has a reduced diameter portion on which threads 26 are formed, and below the threaded portion there are a plurality (four being shown in FIGURE 2) of radially directed slots 27 which receive the press-fitted base portions of the ratchet fingers 22. The bore 28 of the housing 10 is counter-bored at 29 to receive the press-fitted ratchet ring 21 with a plurality of internal teeth 30. The ring element 20, having internal threads 31, is formed with a flange 32 which abuts the outer edge of the ratchet ring 21. The rings 20 and 21 are retained by the cover 17 and the spun-over flange 18.

Referring to FIGURE 1, the stud head 15 is formed with an annular recess 33 which receives an O-ring element 34. The location of the recess 33 is selected so that upon angular swing of the stud and housing relative to each other, the recess does not move out to become uncovered or exposed beyond the margins of element 19. The diameter of element 34 is larger than the depth of the recess 33, so that a portion extends beyond the surface of the stud head and holds the stud head away from the bearing surface 23 in element 19 until an axial load is applied during assembly, such load being applied to the stud followed by rotation of the stud relative to the housing to adjust out initial axial looseness due to manufacturing tolerances of the parts in the assembly. In the completed assembly of the device there are established three zones, F1, F2 and F3, of friction; the first F1 being the O-ring 34, the second F2 being the contact area of the stud head inwardly of the recess 33 upon the bearing element 19, and the third F3 being the engaged surfaces of threads 26 and 31.

Figure 3:
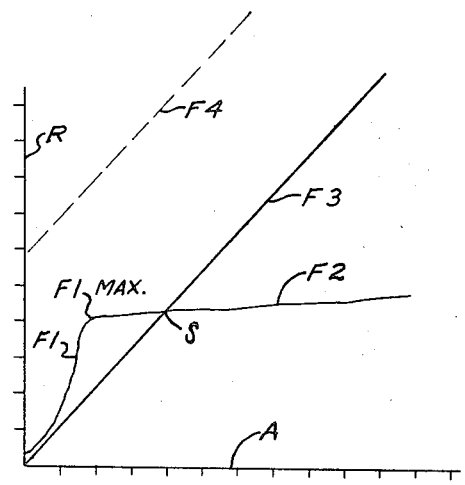
FIGURE 3 is a graphic analysis of the principles of operation of the movable joint device of FIGURE 1, and is representative of other forms of the present invention as will be pointed out.

Turning now to FIGURE 3, the graph is drawn with the applied force along the abscissa A and the friction reaction force along the ordinate R. In the usual loading of the movable joint device the drag reaction between the engaged threads of elements 19 and 20, herein referred to as thread friction F3, increases in proportion to applied load in a linear relationship represented by the line F3. The novel and important feature of the present invention resides in the relationship and interplay of the O-ring 34 and the contact of the stud head 15 in the limited area in bearing surface 23 of element 19. It can be appreciated that as a load is applied to the device, the O-ring will be squeezed into recess 33. There is also a drag reaction between the element 19 and the stud head 15 due to the O-ring or some other means. The yielding nature of the O-ring as shown in FIG. 1 is represented by the graph line F1, which rises rapidly under low loads and until it reaches a maximum force reaction at F1 max. At the point of maximum friction reaction, the stud head 15 is engaged with the limited area of the bearing element 19 and thereafter the friction reaction or drag F2 between these surfaces increases in a gradual manner along the line F2. At some point, as indicated at S in the graph, the friction reaction or drag forces F1 and F2 will equal the friction reaction or drag force F3 in the threads 26 and 31. The point S where the lines F2 and F3 cross is the point where the drag force breaks down and slippage occurs during rotation of the stud head 15 relative to the housing 10. Below the point S the friction reaction forces F1 and F2 are greater than the friction force reaction F3. This relationship is usefully applied in a movable joint device in the following manner, reference again being made to FIGURES 1 and 2 in view of FIGURE 3.

The device when installed has the housing 10 fixed to one portion of the vehicle and the stud shank 16 fixed to another portion which is relatively movable so that the stud head 15 is caused to rotate in the bearing element 19 and is also free to rock angularly on the bearing surface 12. In its initial or new condition there is no axial clearance so the axially applied force or load is taken through the threads 26 and 31 and the friction reaction force on the graph is beyond point S by some predetermined amount. At such time the friction reaction F1 and F2 is less than friction reaction F3 and the stud head 15 will rotate relative to surface 23 in the ring 19 in either direction. Therefore, there is no movement of ring 19 relative to the ratchet ring 21 and the ratchet fingers 22 will remain as shown in FIGURE 2. A plurality of fingers 22 and teeth 30 will, of course, provide a desirably small degree of uni-directional rotation to shift the fingers 22 into teeth 30 other than as shown, reverse rotation being prevented.

When wear produces axial clearance, the O-ring will come into play to control the friction reaction in the device, and the friction reaction force will recede below point S and follow line F2. This action results in relieving the amount of friction reaction F3 in the threads 26 and 31 to a value less than the friction reaction F1 and F2. Now when relative rotation of the stud head 15 occurs in the housing 10, its effect for clockwise movement (FIGURE 2) is to turn the ring element 19, the ratchet fingers 22 merely sliding over the teeth 30. Counterclockwise rotation of stud head 15 will not cause rotation of the ring 19 due to one of the fingers 22 engaging in a tooth 30. The threads 26 and 31 are given the proper inclination so that ring 19 will advance toward the stud head 15 to decrease axial clearance until the point S (FIGURE 3) is exceeded. Thus the wear compensation until will perform its function to keep the axial clearance within a small range, and the friction reaction forces will fluctuate or vary to either side of the point S, following along lines F2 and F3.

The foregoing sets forth the principles of the presently improved movable joint device, and especially the mode of operation of the wear compensation unit incorporated therein. The following description will set forth features in other forms of devices embodying the above, and whenever possible like parts and elements will be designated by like numerals of reference.

Figure 4:
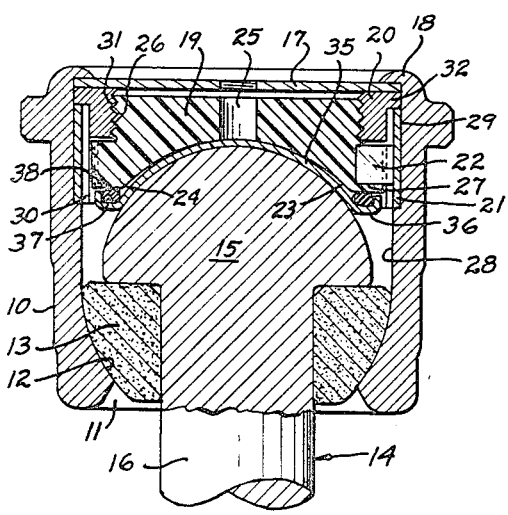
FIGURE 4 is a vertical sectional view of another form of movable joint device embodying further features of this invention.

In FIGURE 4 the device is similar to the device of FIGURE 1 and like reference numerals are applied to like parts. The modification herein is directed to avoiding recessing the stud head 15 and substituting a shallow cup element 35 which closely fits the stud head 15 and is formed with an annular flange 36 which provides a recess for an O-ring element 37. The element 35 has a limited area of contact in the element 19 adjacent the lubricant passage 25 in view of the clearance space 24. The O-ring 37 engages the outer rim 38 of ring 19.

In operation, the device of FIGURE 4 develops a yieldable friction reaction force F1 between the O-ring 37 and the surface 38 on element 19, and a limited friction reaction force F2 between the cup 35 and the area of the element 19 adjacent the passage 25 and within the clearance space 24. There is also the friction reaction force F3 developed between threads 26 and 31, and a still further friction reaction force F4 developed between the cup 35 and the stud head 15, which is of such large value as to assure adjusting rotation of element 19 but not otherwise. The force F4 in the graph of FIGURE 3 is shown at the dash line F4 and is so large that it is beyond the range of forces F1, F2 and F3, which explains why it does not adversely affect the operation, but assures that the cup 35 does not slip on the stud head 15 during rotation. However, the stud head must slip in the cup 35 during angular swing.

Figure 5:
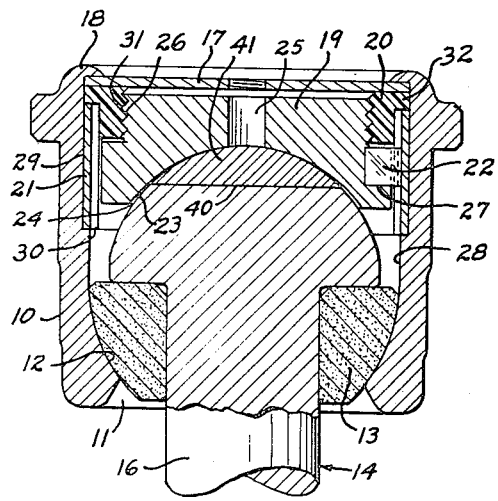
FIGURE 5 is a vertical sectional view of another form of movable joint device embodying further features of this invention.
Figure 6:
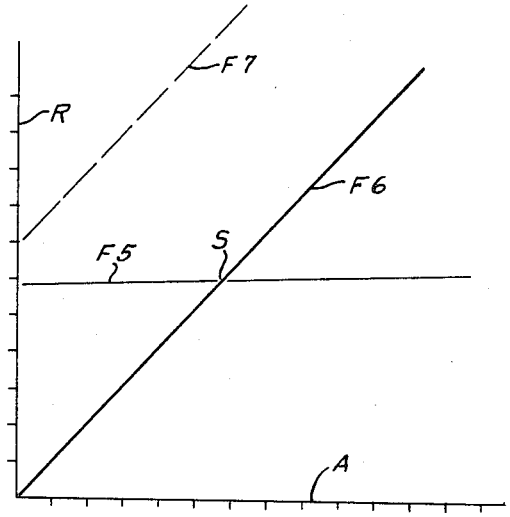
FIGURE 6 is a graphic analysis of the principles of operation of the device illustrated in FIGURE 5 and is representative of certain devices subsequently illustrated.

In FIGURE 5 the device is similar to the device of FIGURE 1, but differs in the respects that a portion of the stud head 15 is cut away to form a flat surface 40 which supports a magnet element 41 formed to complete the spherical shape of the stud head. The magnet 41 develops a substantially constant friction reaction force F5 with the element 19 which is the equivalent of the forces F1 and F2 developed in the device of FIGURE 1. The threads 26 and 31 develop a friction reaction force F6 which is like the force F3 in the device of FIGURE 1. The device of FIGURE 5 follows the same general scheme of operation as above noted, and as graphically illustrated in FIGURE 6. In FIGURE 6 the applied force is found on the abscissa A and the friction reaction force on the ordinate R. As before, the thread friction force is represented by the linear line F6, and the substantially constant magnetic friction force is represented by the line F5. These two lines intersect at point S where slippage occurs when rotation is contra to the ratchet teeth 30 and no axial clearance is present.

Figure 7:
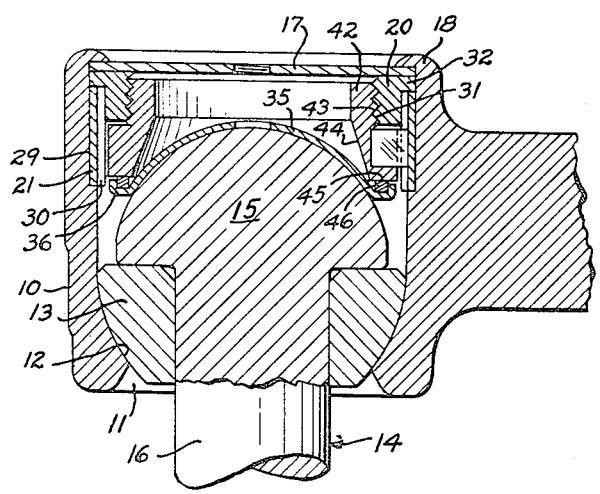
FIGURE 7 is a vertical sectional view of a movable joint device differing somewhat from the device of FIGURE 5.

In FIGURE 7 the device shown is a tie rod end, but otherwise is similar to the device of FIGURE 4, except that a modified element 42 is operably mounted in element 20. The element 42 has external threads 43 engaged in threads 31, and is internally formed with a tapered bore 44 so as to clear the cup element 35 and at the same time present an axially directed annular surface 45 spaced from the flange recess 36 on the cup 35. In this form of the device an annular magnetic element 46 is mounted in the cup recess 36 so as to engage the annular face 45 on element 42 with a substantially constant friction reaction force F5. (See graph of FIGURE 6.) The friction reaction force between threads 31 and 43 is linear in character as is shown by the line F6 in FIGURE 6. There is a third friction reaction force developed between the stud head 15 and the cup 35, and this is represented by the dash line F7 in FIGURE 6. Because of the larger friction force F7, the cup 35 will rotate in both directions with the stud head 15. Again, the stud head 15 can slip relative to the cup 35 during angular movement, as in FIGURE 4. The friction force F5 at magnet 46 and the friction force F6 between threads 31 and 43 will, as before explained, operate to maintain axial clearance at substantially zero.

Figure 8:
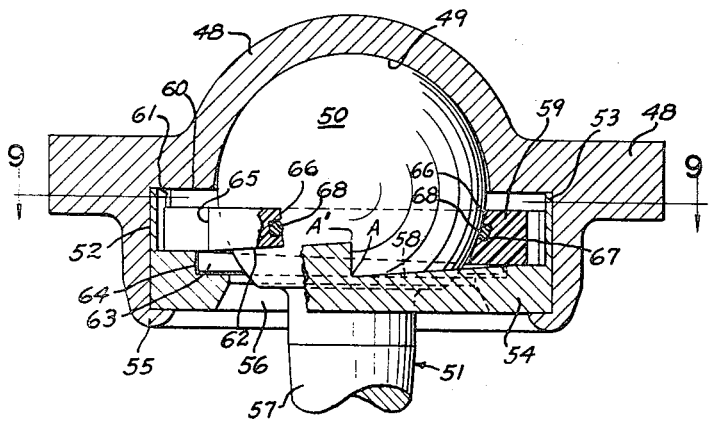
FIGURE 8 is a vertical sectional view of a movable joint device for utility in which the stud is under compression loading.
Figure 9:
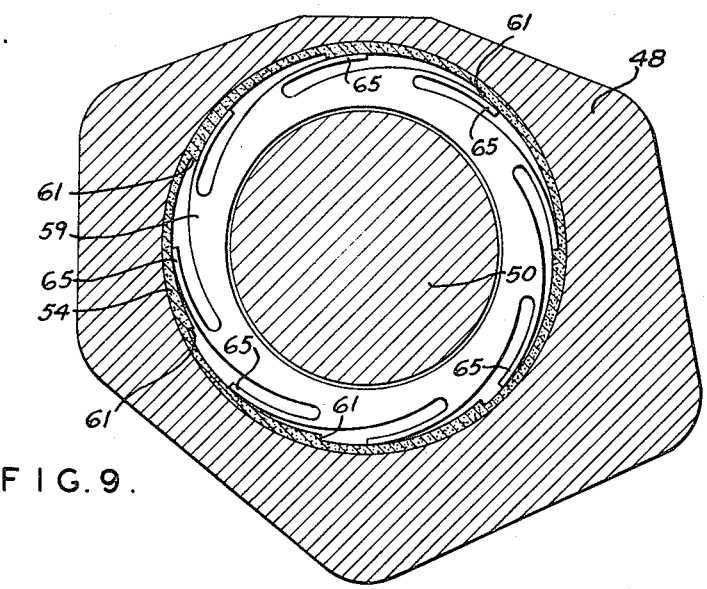
FIGURE 9 is a sectional view taken at line 9—9 in FIGURE 8.

In FIGURES 8 and 9 there is shown a compression loaded device in which the housing 48 provides a bearing surface or cavity 49 that receives the stud head 50 of the stud 51. The housing 48 receives a wear compensation unit, and for such purpose the housing has a cylindrical bore 52 to receive the rim 53 of an element 54 that is part of the wear compensation unit. The element 54 is secured in fixed position in the bore 52 by the spun-over lip 55 on the housing. Element 54 has a central opening 56 to allow the stud shank 57 to project out for connection to a part capable of movement relative to another part carrying housing 48. Element 54 has a single turn cam surface 58 that has its low point at A and progressively rises to the right side, then leftwardly behind the head 50, and finally across in front of the head 50 to end at point A' directly above point A. Element 59 is movably mounted on element 54 before the two elements are assembled in the bore 52, element 59 having an inclined surface matching that on element 54 so that on relative turning element 59 will be axially displaced to force the stud head 50 into its bearing seat 49.

The axial displacement of element 59 is obtained as follows: The element 54 is fixed between the spun-over lip 55 and the inner end surface 60, and is formed with the peripheral rim 53 having teeth 61 on its inner surface (FIGURE 9). Element 54 also has the single complete inclined plane or cam surface 58 surrounding the central opening 56. Element 59 is formed on its lower surface with a single cam surface 62 and a guide projection 63 that centers the element in a recess 64 in element 54. The periphery of element 59 is formed with resilient fingers 65 which are constantly pressing outwardly on the teeth 61. There are an unequal number of teeth 61 and fingers 65 so that a minimum turning distance will register at least one finger 65 with at least one tooth 61. The fingers are to prevent counter turning of the element 59 to increase axial clearance of the stud head 50 and bearing 59. The element 59 is annular in plan and has an inner bearing surface 66 that is engaged on the stud head 50 below the great diameter. Surface 66 is interrupted by an annular recess 67 which cages a resilient O-ring 68. The ring 68 is intended to develop friction engagement with the stud head 50 and element 59 so that turning in one direction of the head 50 relatively to housing 48 will turn element 59 relative to element 54 and cause the cam surface 62 to slide on cam surface 58 in the direction to advance element 59 axially into the bearing 49.

The axial displacement of element 59 will occur if the friction force F1 at O-ring 68 is greater than the friction force F3 between the engaged surfaces of cams 58 and 62. It is, of course, recognized that the friction reaction forces at play in the device of FIGURE 8 are substantially similar to those in the device of FIGURE 1 and as shown in the graph of FIGURE 3. Thus, the O-ring 68 has a friction reaction force F1 which reaches a maximum at F1 MAX. Thereafter the limited surface 66 develops a gradual increase in friction reaction F2 with load increase. At the same time the friction reaction F3 in the cam surfaces 58 and 62 follows a curve which has a linear relation with applied load. When the curve F2 intersects curve F3 the head 50 will slip in element 59 and tightening effort of element 59 on head 50 will stop until wear again develops to reduce the applied load and allow the friction reaction forces to decrease through the slipping point S and follow along curve F2.

Figure 10:
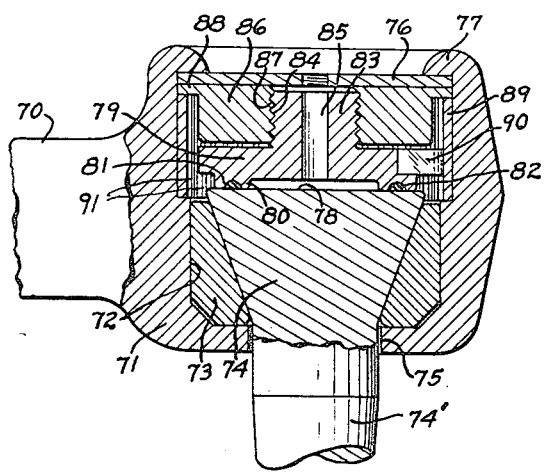
FIGURE 10 is a vertical sectional view of a further movable joint device embodying certain features of the invention.

A further form of the invention is seen in the idler arm type of movable joint device seen in FIGURE 10. In such a joint the only motion desired is turning or rotation, with angular or swinging motion eliminated. Thus the arm 70 has a housing 71 thereon with an internal socket 72 to receive a suitable bearing 73 that holds the stud heads 74 against swinging movement but allows oscillation or turning movement relative to housing 71. The stud shank 74' extends through a suitable opening 75. A cover 76 closes the housing and is held by the spun-over lip 77. A wear compensation unit is operably mounted in the housing 71 adjacent the end face 78 of the stud head 74, and includes an element 79 having an annular projection 80 with a recess 81 to receive an O-ring 82. The element also has a projection 83 with external threads 84, and a lubricant passage 85 axially through the same. Another element 86 is engaged by internal threads 87 with threads 84 on element 79, and a flange 88 on the element 86 is engaged under the cover 76 and the lip 77.

The wear compensation unit also includes a ratchet ring element 89 (similar to ring 21 in FIGURE 2) pressed into the housing and secured by the lip 77 and the interposed cover 76 and flange 88 on element 86. Thus the ring 89 and element 86 are secured against turning relative to housing 71. The element 79 carries ratchet fingers 90 (similar to fingers 22 in FIGURE 2) which engage the teeth 91 in the ring 89 and allow one direction of relative turning but prevent reverse turning.

The operation of the device of FIGURE 10 is graphically shown in FIGURE 3 where the O-ring 82 develops a yieldable friction reaction F1 up to a maximum F1 MAX where the surface on projection 80 takes over and develops a friction reaction F2. The applied load on the threads 84 and 87 develops a linear friction reaction F3 which can vary above and below the combined friction reaction forces F1 and F2. The point S on the curve of F3 represents the point where the stud surface 78 will slip relative to O-ring 82 and the projection 80. At this time all vertical clearance has been taken out.

In all forms of the present device the housing, stud and elements of the wear compensation unit can be made of any suitable material which will support the load and forces. Usually the housings are made of stamped, forged or machined steel with wearing surfaces suitably hardened. The studs are formed of steel of various alloys and usually have hardened surfaces. The bearing elements may be made of suitable combinations of powdered metal, phenolic resins, sintered iron and the like. In the wear compensation units, it is desired that the relatively movable elements engaged by the inclined plane means be made, one from an elastomer and the other from metallic materials, such as steel.

As a more specific example, but without particular limitation, in FIGURE 1 the stud head is a metallic material, the element 19 is an elastomer such as Delrin, nylon or Zytel, and element 20 is metallic. The bearing 13 is of powdered metal, and all wear surfaces are hardened. It is understood that the O-ring 34 can be disposed in the element 19 by forming the recess 33 in element 19, as one is considered the equivalent of the other. The showing in FIGURE 4 is similar to FIGURE 1 as to materials, and the seat in flange 36 for the O-ring is sufficiently large in area as compared to the surface 38 on element 19 so that any slippage will be at surface 38 and in the central area of the surface 23 in element 19.

In FIGURE 5 where the magnetic element 41 is included, it is understood that the larger surface at 40 will be sufficient to make the element 41 move with the head 15. However, the element 41 may be suitably keyed or secured to surface 40 for mechanically interconnecting element 41 and head 15. In view of the magnet 41, the element 19 is formed of metal responsive thereto, and element 20 is formed of a synthetic resin material or elastomer, such as Delrin, nylon or Zytel. It is also contemplated that the magnet 41 could be molded into element 19 when made of an elastomer, which equivalent arrangement would do away with cutting the head at surface 40, and element 20 would then be metallic.

In FIGURE 7 the element 42 is metallic so as to be responsive to the magnetic ring 46. The ring 46 can be seated in the recessed flange 36, or it can be molded into the element 42 if made of an elastomer or the like, in which latter case the cup 35 will be metallic to respond to the magnetic ring. Whatever the material of element 42, the element 20 will be the opposite material. The device of FIGURE 8 is made with element 54 of powdered metal, element 59 of an elastomer, and the housing 48 of a steel forging or metal stamping with hardened surface 49. It is recognized that the O-ring 68 can be a magnetic ring, and that the O-ring or magnetic ring can be recessed into the stud head 50, provided element 59 is suitably dimensional to allow for angular swing of the stud relative to the housing. The structure disclosed is preferred. In FIGURE 10, the element 79 may be steel or an elastomer, and element 86 will be the opposite material. While an O-ring 82 is shown, a magnetic ring may be substituted and the materials of elements 79 and 86 selected in accordance with the suggestions hereinbefore made.

The foregoing sets forth the preferred forms of the present invention which embody the principle of utilizing relative turning motion between two parts of a movable joint device to actuate a wear compensator unit, and to render the unit constantly ready to adjust out wear by incorporating one-way turning control means. In the devices shown and included within the description, it is intended that the inclined plane means can be threads engaged at least 360° of engagement, but preferably more than 360°. However, where the inclined plane is as shown in FIGURE 8, the engagement can be less than 360°, although the plane extends for substantially 360°. It is, of course, the aim hereof to cover all forms of movable joint devices incorporating the means, or its equivalent, set forth in the specification and as will be defined by or reasonably included in the scope of the appended claims.

What is claimed is:

1. In a movable joint device: a housing; a stud having a headed end operatively mounted in said housing for rotational movement relative to said housing; and wear take-up means in said housing including a pair of elements interengaged along inclined surfaces of relative movement, one of said elements being engaged with said housing and the other said element being rotatable relative to said one element to be displaced by said interengaged inclined surfaces toward and away from said stud headed end, means in said joint device causing the displacement of said other element to be effected by frictional drag contact with and rotation of said stud headed end, and means in said housing in contact with said other element to limit displacement thereof always toward said stud headed end whereby wear take-up at said stud headed end is effected by rotation of said other element in one direction with said stud headed end, and on completion of wear take-up said other element is retained against rotation with either direction of stud headed end rotation by the friction between said interengaged inclined surfaces.

2. A wear compensating movable joint device comprising: a housing; a load supporting stud having a headed end operatively mounted in said housing, said housing and stud being at least relatively rotatable and thereby subject to wear; and wear compensating means in said housing including a first element normally stationary in said housing and a second element engaged on said first element at inclined surfaces having first frictional resistance therebetween that is directly proportional to the load sustained thereby and said second element being movable relative to said first element to cause displacement thereof toward and away from said headed end, said second element and said headed end having surfaces of engagement therebetween responsive to wear between said stud and mounting which induce second frictional resistance therebetween that is variably proportional to the load sustained thereby and shift between being in excess to being less than said first frictional resistance, said second element being activated to compensate for wear upon the concurrence of relative rotational movement between said housing and stud and the second frictional resistance being in excess of said first frictional resistance, and means in said joint device engaged with said second element to prevent displacement thereof away from said headed end, continued relative rotational movement of said housing and stud causing said second frictional resistance to become less than said first frictional resistance upon completion of wear compensation, whereby said second element and said headed end slip with respect to each other at said surfaces of engagement.

3. The joint device of claim 2 characterized in that said inclined surfaces are screw threads having more than 360° of engagement.

4. The joint device of claim 2 characterized in that said inclined surfaces are constituted by a continuous surface of substantially 360° of engagement.

5. The joint device of claim 2 characterized in that said surface of engagement of said second element and said headed end includes magnetic means carried by said headed end and said second element is formed of magnetic material.

6. The joint device of claim 2 characterized in that said first and second elements are of different materials such that said inclined surfaces have a different coefficient of friction from the coefficient of friction of the surface of engagement of said second element and said headed end.

7. The joint device of claim 2 characterized in that said second element is formed of an elastomeric material and said first element and headed end are formed of metallic materials.

8. The joint device of claim 2 characterized in that said surface of engagement of said second element and said headed end includes a resilient element which generates a portion of said second friction at resistance.

9. The joint device of claim 8 characterized in that said resilient element has a limited surface of engagement between said second element and said headed end.

10. The joint device of claim 8 characterized in that said resilient element is carried by said second element and has limited surface engagement with said headed end.

11. The joint device of claim 8 characterized in that said resilient element is carried by said headed end and has limited surface engagement with said second element.

12. In a movable joint device: housing means; stud means having a headed end operatively mounted in said housing means for relative rotation; and wear take-up means in said housing means including a pair of relatively movable elements in frictional contact along inclined surfaces, one of said elements being in frictional contact with said headed end, and wear responsive friction inducing means modifying the opposed surfaces of said wear take-up means and an adjacent means of the joint device to increase the overall frictional resistance between the wear take-up means and said adjacent means of the joint device beyond that present between said inclined surfaces upon the occurrence of predetermined wear between said headed end and its mounting and so allow movement of said one of said elements with the stud via the frictional drag therebetween to take-up wear.

13. The movable joint device set forth in claim 12 therein said wear take-up means is positioned between said housing and said headed end.

14. The device set forth in claim 12 wherein said friction inducing means is disposed between said one element and said headed end.

15. The device set forth in claim 14 wherein said friction inducing means is carried by said one element and has a limited surface engagement with said headed end.

16. In a movable joint device: a housing; a stud having a headed end operatively mounted in said housing for rotational movement relative to said housing; and wear take-up means in said housing including a pair of elements interengaged along inclined surfaces of relative movement, one of said elements being engaged with said housing and the other said element being rotatable relative to said one element to be displaced by said interengaged inclined surfaces toward and away from said stud headed end, rotary motion limiting means in said housing engaged with said other element preventing rotary motion thereof and relative movement at said inclined surfaces in a direction away from said stud headed end, said other element and said stud headed end having surfaces of engagement subject to loading by the load imposed on the joint device and said other element acting to transmit the loading to said one element at said inclined surfaces, and means in said joint device between said other element and said stud headed end to cause the friction drag transmitted to said other element from said stud headed end in rotation relative to said housing to rotate said other element to take up wear, wear take-up being completed by said other element transmitting the load on said joint device into said inclined surfaces such that the friction drag at said inclined surfaces exceeds said first mentioned friction drag and stops further rotary movement of said other element with said stud headed end.

References Cited

UNITED STATES PATENTS

| 173,046 | 2/1876 | Nix | 287—90 |
| 2,115,087 | 4/1938 | Schaefer | 287—90 |
| 2,539,186 | 1/1951 | French | 287—90 |
| 2,593,253 | 4/1952 | Booth | 287—90 |
| 3,154,332 | 10/1964 | Scheublein et al. | 287—87 |
| 3,250,555 | 5/1966 | Wehner | 287—90 |
| 3,325,197 | 6/1967 | Wehner | 287—90 |

FOREIGN PATENTS

| 334,090 | 8/1938 | Great Britain. |
| 674,267 | 6/1952 | Great Britain. |

CARL W. TOMLIN, *Primary Examiner.*

ANDREW V. KUNDRAT, *Assistant Examiner.*